US009286860B2

(12) United States Patent
Sudo

(10) Patent No.: US 9,286,860 B2
(45) Date of Patent: Mar. 15, 2016

(54) IMAGE DISPLAY DEVICE

(71) Applicant: SEIKO EPSON CORPORATION, Tokyo (JP)

(72) Inventor: Kiyoto Sudo, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/254,595

(22) Filed: Apr. 16, 2014

(65) Prior Publication Data

US 2014/0225937 A1 Aug. 14, 2014

Related U.S. Application Data

(63) Continuation of application No. 12/337,202, filed on Dec. 17, 2008, now Pat. No. 8,733,946.

(30) Foreign Application Priority Data

Dec. 18, 2007 (JP) ................................ 2007-326016

(51) Int. Cl.
*G03B 21/20* (2006.01)
*G09G 5/10* (2006.01)
*H05B 41/38* (2006.01)

(52) U.S. Cl.
CPC . *G09G 5/10* (2013.01); *H05B 41/38* (2013.01)

(58) Field of Classification Search
CPC ........... G03B 21/20; G03B 21/14; G09G 5/00
USPC ............................................................ 353/85
See application file for complete search history.

(56) References Cited

U.S. PATENT DOCUMENTS

| | | | | |
|---|---|---|---|---|
| 6,588,907 | B1 | 7/2003 | Billington et al. | |
| 6,783,252 | B1 * | 8/2004 | Cambron | 353/122 |
| 7,309,134 | B2 | 12/2007 | Cambron | |
| 2004/0201823 | A1 * | 10/2004 | Raskar et al. | 353/69 |
| 2005/0073845 | A1 * | 4/2005 | Matsui | 362/293 |
| 2005/0094110 | A1 * | 5/2005 | Nakamura | 353/85 |
| 2005/0110953 | A1 * | 5/2005 | Castaldi et al. | 353/30 |
| 2006/0170883 | A1 | 8/2006 | Matsui | |
| 2006/0192899 | A1 | 8/2006 | Ogita | |

(Continued)

FOREIGN PATENT DOCUMENTS

| | | | |
|---|---|---|---|
| JP | 2006-267995 | A | 10/2006 |
| JP | 2007-019476 | A | 1/2007 |

*Primary Examiner* — William C Dowling
*Assistant Examiner* — Jerry Brooks
(74) *Attorney, Agent, or Firm* — Maschoff Brennan

(57) ABSTRACT

An image display apparatus includes a light source device, a light source control unit which controls power supplied to the light source device and an image light emission unit which, utilizing a source light emitted from the light source device, emits an image light. A light quantity measurement unit measures a quantity of the source light. A power/light quantity characteristic derivation unit derives a power/light quantity characteristic. A light quantity adjustment unit, based on the power/light quantity characteristic, adjusts the quantity of the source light or the image light. The light source control unit controls the supplied power to gradually change the light quantity of the source light. The light quantity measurement unit measures the light quantity of the gradually changing source light and acquires light quantity data. The power/light quantity characteristic derivation unit, based on the light quantity data and the supplied power, derives the power/light quantity characteristic.

8 Claims, 8 Drawing Sheets

<Voltage/light quantity characteristic>

(56) References Cited

U.S. PATENT DOCUMENTS

2006/0273331 A1* 12/2006 Lim et al. ........................ 257/80
2006/0274286 A1* 12/2006 Morejon et al. ................ 353/85
2007/0035706 A1 2/2007 Margulis
2007/0278963 A1* 12/2007 Wu et al. ....................... 315/149
2008/0094579 A1 4/2008 Fujinawa et al.

* cited by examiner

IMAGE DISPLAY DEVICE

RELATED APPLICATIONS

This application is a continuation of U.S. patent application Ser. No. 12/337,202, filed Dec. 17, 2008, which claims priority to Japanese Patent Application No. 2007-326016, filed Dec. 18, 2007. The foregoing applications are incorporated herein by reference.

TECHNICAL BACKGROUND

The present invention relates to a technology of adjusting a light quantity in an image display apparatus.

In recent years, it happens that a semiconductor light source, such as a light emitting diode (LED) or a laser diode (LD), is used as a light source of an image display apparatus such as a projector or a television receiver (refer to JP-A-2007-19476).

With these semiconductor light sources, it can happen that a correlative relationship between an applied voltage and a light quantity (a voltage/light quantity characteristic) changes due to a temporal deterioration or an ambient temperature change. Then, in this case, even when providing the semiconductor light source with the applied voltage based on the voltage/light quantity characteristic before the change, it becomes impossible to emit a desired light quantity. Therein, to date, a voltage/light quantity characteristic review has been carried out after shipping the image display apparatus. Specifically, the applied voltage has been changed, the light quantity measured at each voltage, and the voltage/light quantity characteristic corrected based on such measurement data.

However, the measurement of the light quantity for reviewing the voltage/light quantity characteristic has been carried out utilizing a period in which a screen is comparatively dark, such as a flyback period when displaying an image. This is in order, as far as possible, not to let a user see a change in the light quantity caused by a change in the applied voltage. However, as the flyback period is extremely short at, for example, approximately 1 mS at an XGA resolution, it not being possible to sufficiently carry out the measurement of the light quantity, it has only been possible to acquire an extremely small amount of measurement data. As such, it being extremely difficult to correct the voltage/light quantity characteristic after the change to a high degree of accuracy, it has been extremely difficult to display an image with a desired light quantity.

As the voltage/light quantity characteristic can change, not only in the case in which the semiconductor light source temporally deteriorates, but also in a case in which a usage environment (a temperature and the like) of the image display apparatus changes, the heretofore described problem can occur. Also, the heretofore described problem, not being limited to the case of using the semiconductor light source, can also occur in a case of using a lamp light source, such as a UHP (Ultra High Performance) lamp or a metal halide lamp. Also, the heretofore described problem can also occur in a configuration wherein the light quantity is adjusted by a supplied current instead of the applied voltage.

SUMMARY OF THE INVENTION

The invention has an object of providing a technology whereby it is possible, in the image display apparatus, to display an image with a desired light quantity, even in the event that the light source device temporally deteriorates, or in the event that there is a change in the usage environment.

The invention, having been contrived in order to solve at least one portion of the heretofore described problem, can be realized as the following embodiments or application examples.

Application Example 1

An image display apparatus which emits an image light expressing an image, and displays the image, includes a light source device, a light source control unit which controls a power supplied to the light source device, an image light emission unit which, utilizing a source light emitted from the light source device, emits the image light, a light quantity measurement unit which measures a light quantity of the source light, a power/light quantity characteristic derivation unit which derives a power/light quantity characteristic indicating a relationship between the supplied power and the light quantity of the source light, and a light quantity adjustment unit which, based on the power/light quantity characteristic, adjusts the light quantity of at least one of the source light and the image light. The light source control unit executes a first process of controlling the supplied power in such a way that the light quantity of the source light gradually changes, the light quantity measurement unit executes a second process of measuring the light quantity of the source light which gradually changes in the first process, and acquiring light quantity data, and the power/light quantity characteristic derivation unit executes a third process of, based on the light quantity data acquired in the second process and on the supplied power, deriving the power/light quantity characteristic.

With the image display apparatus of the application example 1, as the light quantity of the source light is gradually changed, and the power/light quantity characteristic is derived based on the light quantity data obtained by measuring the gradually changing light quantity, and on the supplied power, even in the event that the light source device temporally changes, or in the event that the usage environment changes, it being possible to review the power/light quantity characteristic, it is possible to display an image with a desired light quantity. Also, as the light quantity data are obtained by measuring the gradually changing light quantity, it being possible to acquire a comparatively large amount of light quantity data, it is possible to correct the power/light quantity characteristic to a high degree of accuracy.

Application Example 2

In the image display apparatus according to application example 1, in a period from the image display apparatus starting up until displaying a source screen which differs from a start up screen, (i) the light source control unit executes the first process, (ii) the light quantity measurement unit executes the second process, and (iii) the power/light quantity characteristic derivation unit executes the third process.

By so doing, it is possible to execute the first process to the third process in a period which is amply long in comparison with the flyback period, or the like, that being the period from the image display apparatus starting up until displaying the source screen, which differs from the start up screen. Consequently, it being possible to acquire a comparatively large amount of light quantity data, it is possible to correct the power/light quantity characteristic to a high degree of accuracy.

Application Example 3

In the image display apparatus according to application example 1 or 2, the light source control unit, in the first process, changes the supplied power in such a way that the light quantity of the source light gradually decreases, and the image light emission unit, while the first process is being executed, emits an image light expressing the start up screen.

By so doing, while executing the first process to the third process, the start up screen appears to fade out when seen by a user. Consequently, even in the event that the light quantity of the source light changes due to executing the first process, it is possible to avoid giving the user a feeling that something is wrong.

Application Example 4

In the image display apparatus according to any one of application examples 1 to 3, the light quantity adjustment unit, based on the power/light quantity characteristic, adjusts the light quantity of the source light by controlling the supplied power, using the light source control unit.

By so doing, it is possible to carry out the adjustment of the light quantity of the source light in real time, and to a higher degree of accuracy.

PREFERRED EMBODIMENTS

Hereafter, a description will be given of a preferred aspect for implementing the invention, based on embodiments, in the below order.

A. First Embodiment:
B. Second Embodiment:
C. Modification Examples:

A. First Embodiment

Figure 1:
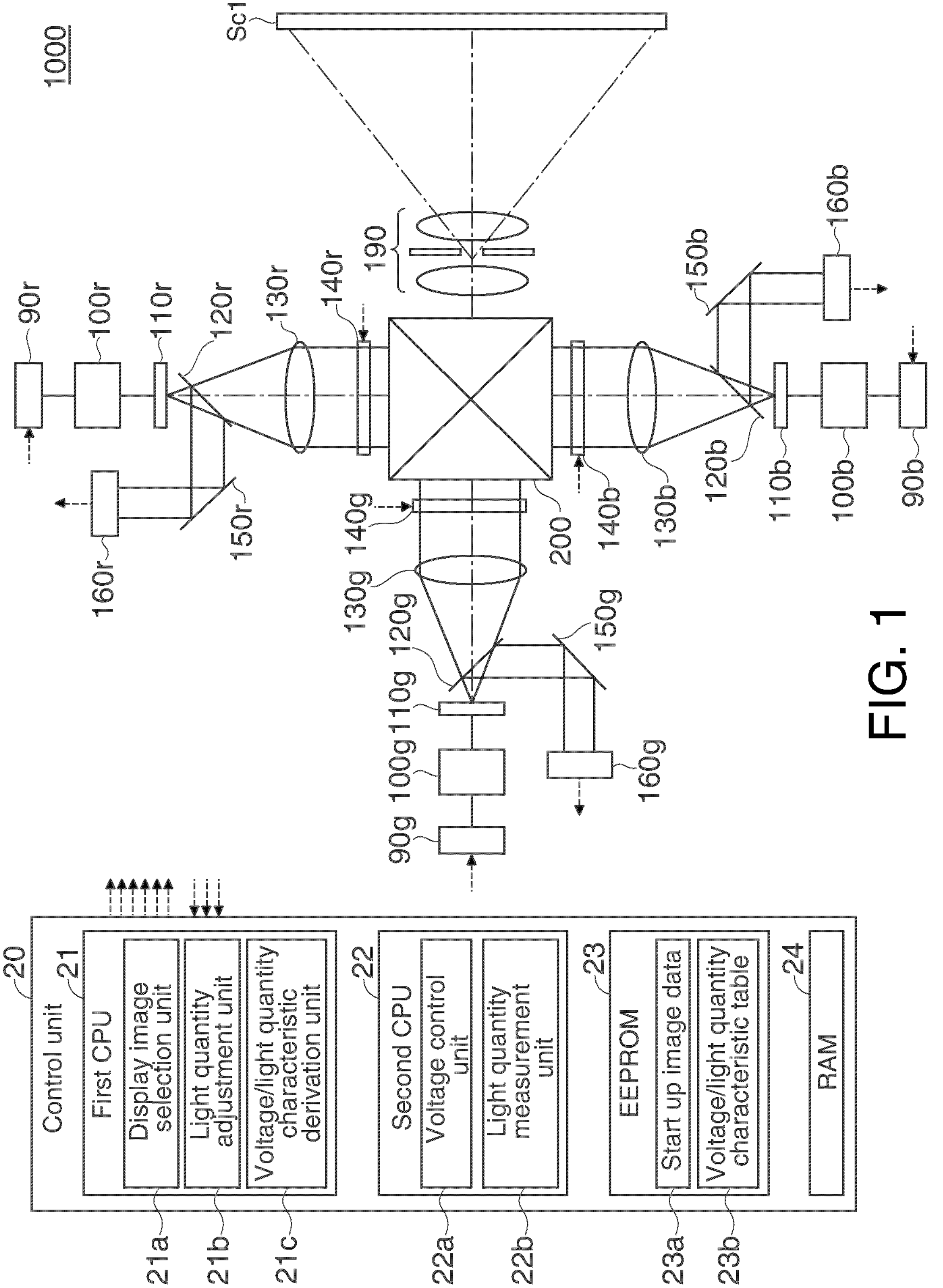
FIG. 1 is an illustrative diagram showing an outline configuration of a projector as one embodiment of the invention.

FIG. 1 is an illustrative diagram showing an outline configuration of a projector as one embodiment of the invention. A projector 1000 includes a laser light source device 100*r*, which emits a red laser light, a laser light source device 100*g*, which emits a green laser light, and a laser light source device 100*b*, which emits a blue laser light. Also, the projector 1000 includes three applied voltage adjustment mechanisms 90*r*, 90*g* and 90*b*, three diffusion plates 110*r*, 110*g* and 110*b*, six mirrors 120*r*, 120*g*, 120*b*, 150*r*, 150*g* and 150*b*, three lenses 130*r*, 130*g* and 130*b*, three liquid crystal light valves 140*r*, 140*g* and 140*b*, three photodiodes 160*r*, 160*g* and 160*b*, a dichroic prism 200, a projection optical system 190, and a control unit 20. The projector 1000 synthesizes image lights derived from each color of laser light, R (red), G (green) and B (blue), in the dichroic prism 200, and projects the synthesized light onto a screen Sc1, displaying a full color image. Configurations for projecting each color of image light, R, G and B, are almost identical to each other. As such, a description will be given hereafter of, as a representative, the configuration for projecting the red image light.

The laser light source device 100*r* emits a red light, of which a central wavelength is 635 nm and which has a predetermined bandwidth. It is possible to configure the laser light source device 100*r* using, for example, a semiconductor laser array in which a plurality of surface emitting type laser elements are aligned. The applied voltage adjustment mechanism 90*r* adjusts a voltage applied to the laser light source device 100*r*. It is possible to configure the applied voltage adjustment mechanism 90*r* as, for example, a circuit using a variable resistor. The diffusion plate 110*r* diffuses the laser light source emitted from the laser light source device 100*r*. It is possible to create the diffusion plate 110*r* using, for example, a CGH (Computer Generated Hologram). Specifically, it is possible to create it by, for example, creating a point symmetrical micropattern, using a CGH, which causes a diffractive scattering of light from a light source, and provides an almost random phase, and depicting the micropattern on a transparent substrate, using an electron beam printing device, or the like. The mirror 120*r* transmits almost all incident light, and reflects the remaining slight quantity of light. For example, it is possible to adopt a configuration such that the mirror 120*r* transmits 90% of the incident light, and reflects 10% of the incident light. As this kind of mirror 120*r*, it is possible to use, for example, one wherein a dielectric thin film layer (such as a TiO2 layer or an SiO2 layer) is formed on a glass substrate. The light transmitted through the mirror 120*r* falls incident on the lens 130*r*. The lens 130*r*, forming a pair with the diffusion plate 110*r*, configures a uniformizing optical system for uniformizing an illuminance distribution of light which irradiates the liquid crystal light valve 140*r*. Image data on a red image are input into the liquid crystal light valve 140*r*. Then, the liquid crystal light valve 140*r* modulates red light transmitted through the lens 130*r* in accordance with the input image data. The red light modulated in the liquid crystal light valve 140*r* falls incident on the dichroic prism 200.

The same kind of configuration applies for the green and blue. For the laser light source device 100*g* and the laser light source device 100*b*, it is also possible to adopt a configuration such that, using a wavelength conversion element such as PPLN (Periodically Poled LiNb3), a green light or a blue light is emitted by converting a wavelength of light with a comparatively long wavelength (such as the red light). By so doing, green light modulated in accordance with image data on a green image, and blue light modulated in accordance with image data on a blue image, fall incident on the dichroic prism 200 along with the modulated red light. The dichroic prism 200 being formed by affixing together four right angle prisms, a dielectric multilayer film which reflects the red light, and a dielectric multilayer film which reflects the blue light, are disposed in a cross shape in an interior thereof. Consequently, the individual colors of image light falling incident on the dichroic prism 200 are synthesized together, and projected onto the screen Sc1 by the projection optical system 190.

One portion of the red light reflected by the heretofore described mirror 120*r* heads toward the mirror 150*r*. Then, of the light which has headed toward the mirror 150*r*, one portion (for example, 10%) is reflected by the mirror 150*r*, and falls incident on the photodiode 160*r*. For the mirror 150*r*, it is possible to adopt the same kind of configuration as for the heretofore described mirror 120*r*. The photodiode 160*r*, functioning as a light sensor, sends a current (a light current) in accordance with a quantity of the incident light. The light current sent by the photodiode 160*r* is input into the control unit 20 as a signal indicating the quantity of light.

The control unit 20 includes a first CPU 21, a second CPU 22, an EEPROM 23, and an RAM 24. The first CPU 21 is a general purpose CPU (Central Processing Unit) for controlling a whole of the projector 1000. The first CPU 21, under a predetermined operating system, functions as a display image selection unit 21*a* by executing a control program (not shown) stored in the EEPROM 23. In the same way, the first CPU 21 also functions as a light quantity adjustment unit 21*b*, and a voltage/light quantity characteristic derivation unit 21*c*.

The display image selection unit 21*a* selects an image to be projected and displayed by the projector 1000, and inputs its image data into the liquid crystal light valves 140*r*, 140*g* and 140*b*. The light quantity adjustment unit 21*b* adjusts a light quantity of each of the laser light source devices 100*r*, 100*g* and 100*b*. Specifically, the light quantity adjustment unit 21*b* adjusts the light quantity by controlling a voltage control unit 22*a*, to be described hereafter, and adjusting a voltage applied to each of the laser light source devices 100*r*, 100*g* and 100*b*, in accordance with a luminance value of the image data to be displayed. The voltage/light quantity characteristic derivation unit 21*c* derives a relationship (voltage/light quantity characteristic) between the applied voltage and the light quantity in each of the laser light source devices 100*r*, 100*g* and 100*b*.

The second CPU 22, being a dedicated CPU for controlling each of the laser light source devices 100*r*, 100*g* and 100*b*, functions as the voltage control unit 22*a* and a light quantity measurement unit 22*b* by executing a program stored in a memory (not shown) disposed inside the second CPU 22. The voltage control unit 22*a*, controlling the applied voltage adjustment mechanisms 90*r*, 90*g* and 90*b*, controls the voltage applied to each of the laser light source devices 100*r*, 100*g* and 100*b*. The light quantity measurement unit 22*b* inputs the light current from each of the photodiodes 160*r*, 160*g* and 160*b*, and measures a light quantity of the light emitted from each of the laser light source devices 100*r*, 100*g* and 100*b*.

Start up image data 23*a*, and a voltage/light quantity characteristic table 23*b*, are stored in advance, when the projector 1000 is shipped, in the EEPROM 23. The startup image data 23*a*, being image data used in a voltage/light quantity characteristic review process, to be described hereafter, are image data of a start up screen of the projector 1000. As the start up image data 23*a*, it is possible to employ, for example, a logo of a manufacturer of the projector 1000, or the like. The voltage/light quantity characteristic table 23*b*, based on the voltage/light quantity characteristic of each of the laser light source devices 100*r*, 100*g* and 100*b*, indicates a correlative relationship between the applied voltage and the light quantity. Then, the voltage/light quantity characteristic table 23*b* is generated in the following way. That is, before shipping, the light quantity emitted by each of the laser light source devices 100*r*, 100*g* and 100*b*, in the event that the applied voltage is changed, is measured by experiment, the voltage/light quantity characteristic is derived, and the voltage/light quantity characteristic table 23*b* is compiled based on the voltage/light quantity characteristic. However, the voltage/light quantity characteristic may change in accordance with a temporal deterioration of each of the laser light source devices 100*r*, 100*g* and 100*b*, or a change in a usage environment of the projector 1000.

Each of the heretofore described laser light source devices 100*r*, 100*g* and 100*b* corresponds to a light source device in the claims. Also, each of the liquid crystal light valves 140*r*, 140*g* and 140*b*, the dichroic prism 200, and the projection optical system 190 correspond to an image light emission unit in the claims, the voltage/light quantity characteristic derivation unit 21*c* to a power/light quantity characteristic derivation unit in the claims, and the voltage control unit 22*a* to a light source control unit in the claims.

Figure 2:
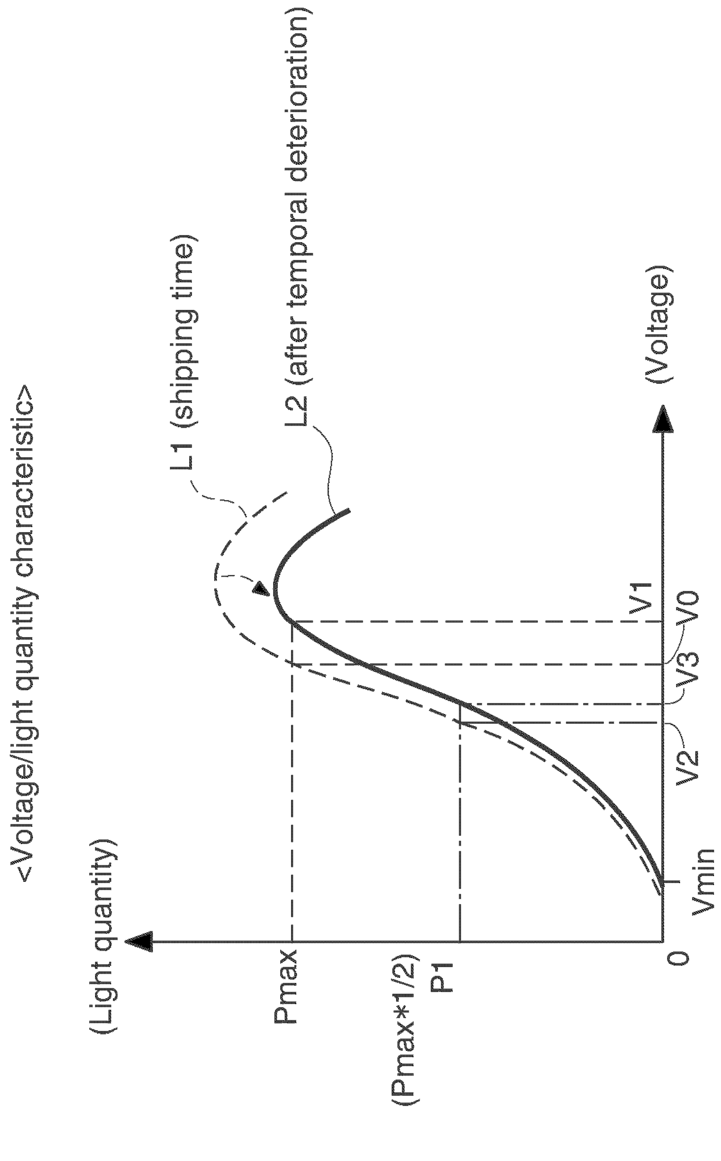
FIG. 2 is an illustrative diagram schematically showing a voltage/light quantity characteristic of each of laser light source devices 100*r*, 100*g* and 100*b*.

FIG. 2 is an illustrative diagram schematically showing the voltage/light quantity characteristic of each of the laser light source devices 100*r*, 100*g* and 100*b*. In FIG. 2, a horizontal axis shows the voltage applied to each of the laser light source devices 100*r*, 100*g* and 100*b*, while a vertical axis shows the light quantity of the light emitted from each of the laser light source devices 100*r*, 100*g* and 100*b*. Also, in FIG. 2, a line L1, shown as a broken line, shows the voltage/light quantity characteristic at the time of shipping, while a line L2, shown as a solid line, shows the voltage/light quantity characteristic after the temporal deterioration. Each of the laser light source devices 100*r*, 100*g* and 100*b* has the same voltage/light quantity characteristic.

As a characteristic of each of the laser light source devices 100*r*, 100*g* and 100*b*, on raising the applied voltage for a predetermined value (V minutes) or more, the light quantity also increases in conjunction therewith. However, in the event that the applied voltage becomes extremely high, the light quantity decreases with a certain voltage (a turnover voltage) as a borderline. In this way, the voltage/light quantity characteristic in a voltage range near the turnover voltage differs greatly from the voltage/light quantity characteristic in a voltage range distant from the turnover voltage. Therein, with the projector 1000, in order to adjust the light quantity in a voltage range which has a virtually identical voltage/light quantity characteristic, the light quantity in each of the laser light source devices 100*r*, 100*g* and 100*b* is adjusted with a light quantity of an order of approximately 80% of a light quantity at the turnover voltage at the time of shipping as a maximum emitted light quantity (Pmax).

Herein, in the event that each of the laser light source devices 100*r*, 100*g* and 100*b*, going through a long period of use, temporally deteriorates, the voltage/light quantity characteristic becomes different from the characteristic at the time of shipping. In the example of FIG. 2, the voltage/light quantity characteristic, because it temporally deteriorates, changes from the line L1 to the line L2. As a result, after the temporal deterioration, the voltage when the light quantity of each of the laser light source devices 100*r*, 100*g* and 100*b* reaches the maximum emitted light quantity Pmax is V1, which is higher than V0 at the time of shipping. Consequently, after the temporal deterioration, even in the event that the applied voltage is made V0, it is not possible to obtain the maximum emitted light quantity Pmax. In the same way, in the example of FIG. 2, the applied voltage when a light quantity P1, which is one half of the maximum emitted light quantity Pmax, is emitted is V3, which is higher than V2 at the time of shipping. With the projector 1000, a configuration is such that, even in the event that the voltage/light quantity characteristic changes in this way, it is possible to project an image with a desired light quantity by reviewing the voltage/light quantity characteristic when starting up.

Figure 3:
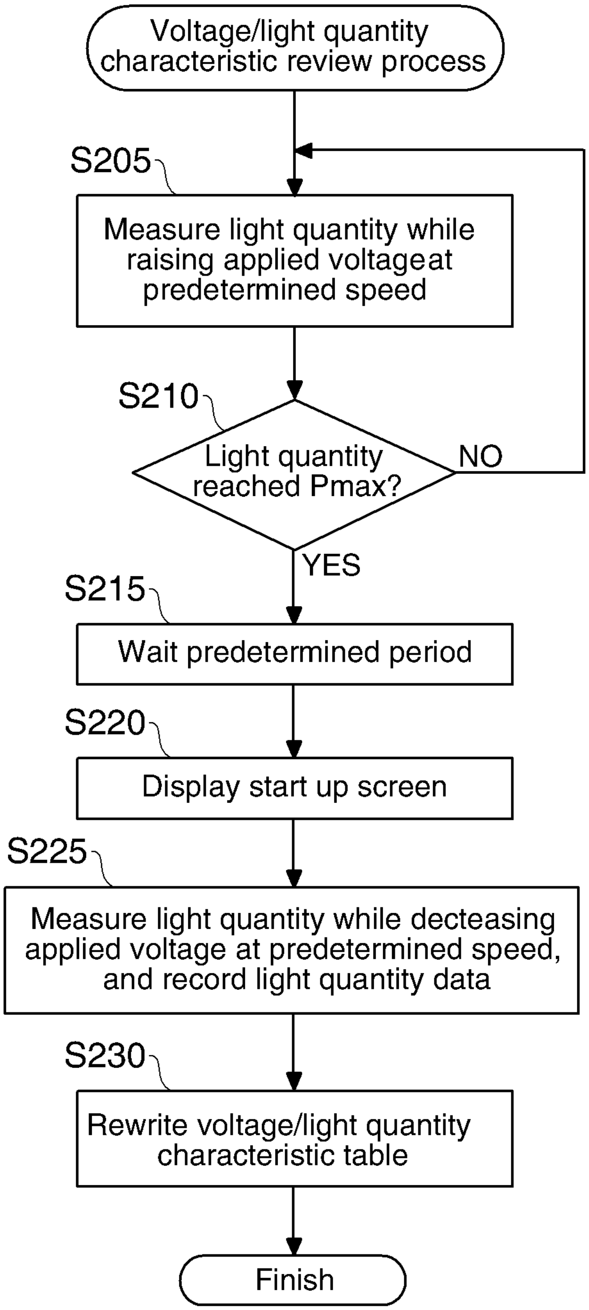
FIG. 3 is a flowchart showing a procedure of a voltage/light quantity characteristic review process executed at a start up time of a projector 1000.

FIG. 3 is a flowchart showing a procedure of the voltage/light quantity characteristic review process executed at the start up time of the projector 1000. In the projector 1000, on power being turned on, the voltage/light quantity characteristic review process is started. In step S205, the voltage control unit 22*a* (FIG. 1), controlling each of the applied voltage adjustment mechanisms 90*r*, 90*g* and 90*b*, raises the voltage applied to each of the laser light source devices 100*r*, 100*g* and 100*b* at a predetermined speed. On the applied voltage rising, and exceeding a predetermined threshold value Vmin, each of the laser light source devices 100*r*, 100*g* and 100*b* starts to emit a light. On so doing, each of the photodiodes 160*r*, 160*g* and 160*b* receives the light, and sends a light current, and the light quantity measurement unit 22*b* inputs the light current, and measures the light quantity of each of the laser light source devices 100*r*, 100*g* and 100*b*.

Then, the voltage control unit 22*a* raises the applied voltage until the emitted light quantities of the laser light source devices 100*r*, 100*g* and 100*b* each reach Pmax (step S210).

Figure 4:
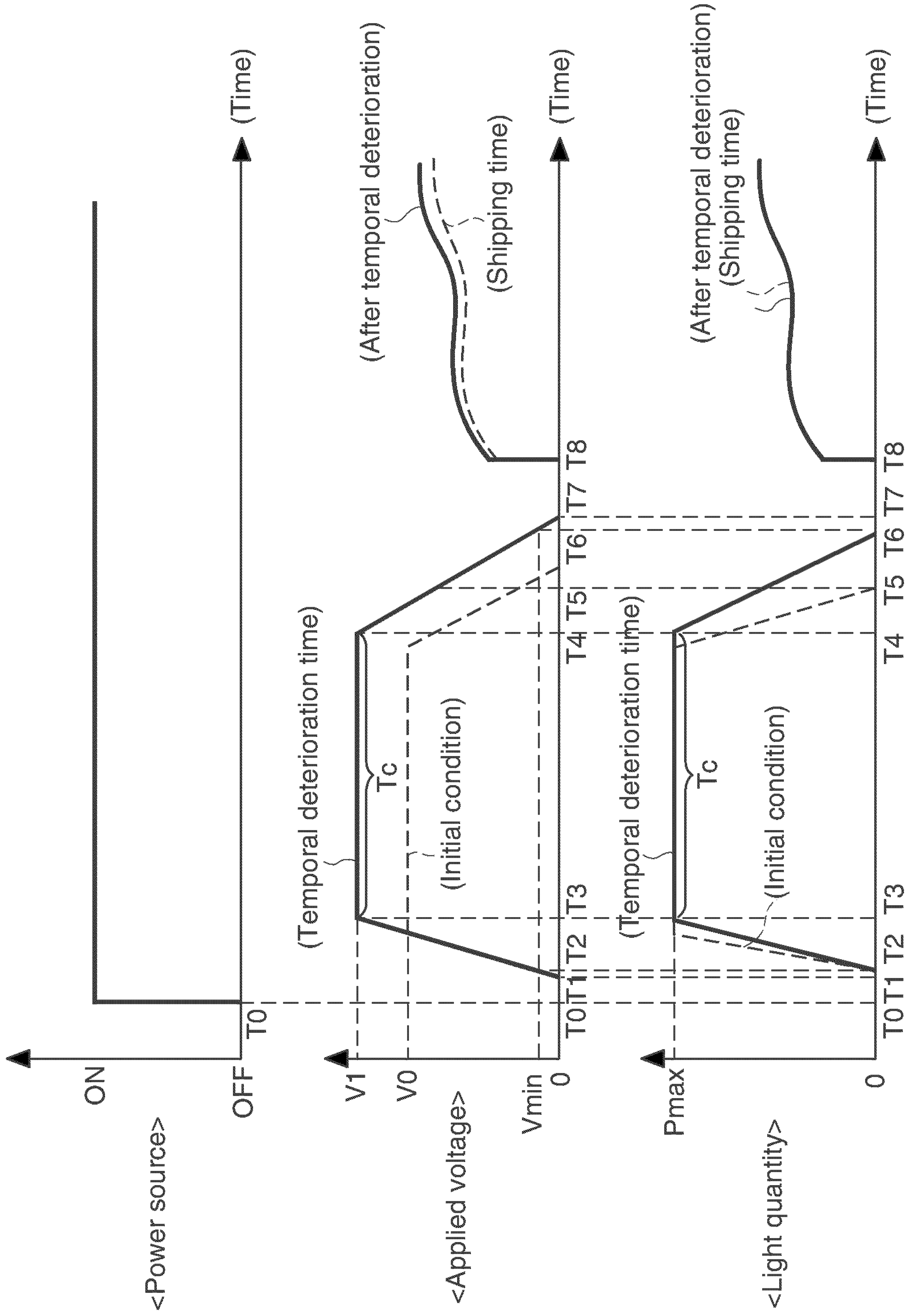
FIG. 4 is a timing chart showing the change in an applied voltage and light quantity when executing the voltage/light quantity characteristic review process.

FIG. 4 is a timing chart showing the change in the applied voltage and light quantity when executing the voltage/light quantity characteristic review process. In FIG. 4, a top section shows an on/off condition of the power of the projector 1000, a middle section shows the voltage applied to each of the laser light source devices 100*r*, 100*g* and 100*b*, and a bottom section shows the emitted light quantity of each of the laser light source devices 100*r*, 100*g* and 100*b*. In each section, a horizontal axis shows a time. Also, the change in the applied voltage and light quantity in the event of carrying out the voltage/light quantity characteristic review process before shipping is shown by a broken line.

In the example of FIG. 4, the power of the projector 1000 is turned on at a time T0, and the raising of the applied voltage is started at a time T1. As the applied voltage exceeds the threshold value Vmin at a time T2, each of the laser light source devices 100*r*, 100*g* and 100*b* starts to emit the light, after which, the light quantity gradually increases. Then, the light quantity reaching Pmax at a time T3, the applied voltage at the time is V1. A speed at which the light quantity rises before shipping being greater than that after the temporal deterioration, the light quantity reaches Pmax when the applied voltage is V0, which is lower than V1, and the time then is earlier than the previously described T3. This is due to the change in the voltage/light quantity characteristic.

In step S215 (FIG. 3), the voltage control unit 22*a* waits a predetermined period after the light quantity has reached Pmax. In the example of FIG. 4, the voltage control unit 22*a* waits until a time T4, at which a predetermined period Tc has elapsed from the time T3. In this waiting period, a temperature of each of the laser light source devices 100*r*, 100*g* and 100*b* (FIG. 1) stabilizes, a predetermined operation system starts up in the control unit 20, and each of the function units 21*a* to 21*d* becomes operable in the first CPU 21.

After waiting the predetermined period in the heretofore described step S215, the display image selection unit 21*a* (FIG. 1), in step S220 (FIG. 3), retrieves the start up image data 23*a* from the EEPROM 23 and inputs them into each of the liquid crystal light valves 140*r*, 140*g* and 140*b*, displaying the start up screen.

In step S225, the voltage control unit 22*a*, controlling each of the applied voltage adjustment mechanisms 90*r*, 90*g* and 90*b*, and decreases the voltage applied to each of the laser light source devices 100*r*, 100*g* and 100*b* at a predetermined speed. In conjunction with this, the light quantity measurement unit 22*b* measures the light quantity of each of the laser light source devices 100*r*, 100*g* and 100*b*, and stores light quantity data in the RAM 24, correlated to the applied voltage at the time. Of the processes of such a step S225, the process of decreasing the applied voltage at the predetermined speed corresponds to a first process in the claims. Also, of the processes of step S225, the process of storing the light quantity data in the RAM 24, correlated to the applied voltage at the time, corresponds to a second process in the claims.

In the example of FIG. 4, the applied voltage decreases gradually from the time T4. In conjunction with this, the light quantity also decreases gradually. Then, as the applied voltage reaches Vmin at a time T6, the light quantity becomes zero. Then, the applied voltage becoming zero at a time T7, the process of step S225 finishes. As the voltage/light quantity characteristic changes compared with that at the time of shipping, in the way heretofore described, a decreasing speed of the light quantity in step S225, after the temporal deterioration, is less than a decreasing speed of the light quantity at the time of shipping (before shipping).

Figure 5:
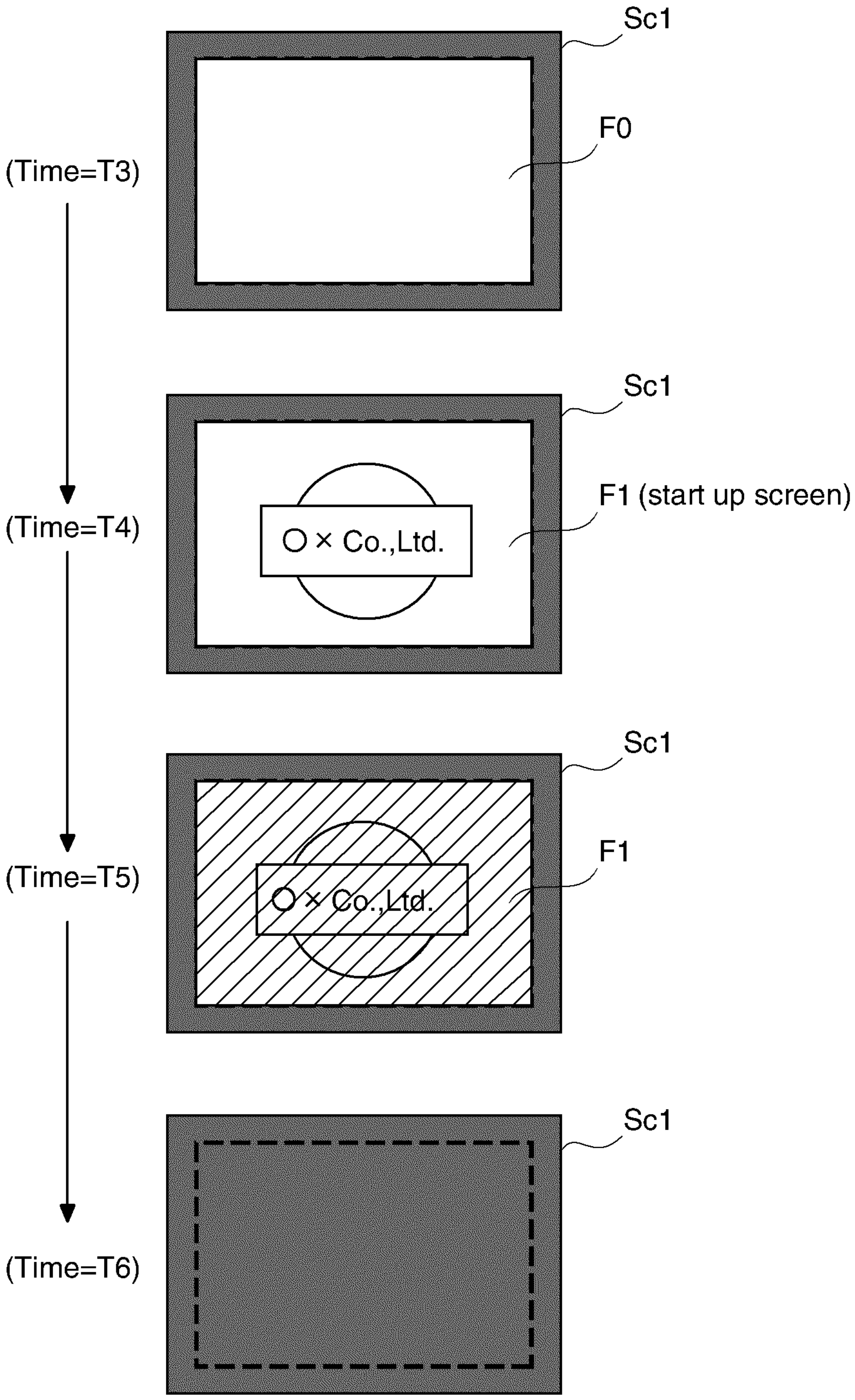
FIG. 5 is an illustrative diagram showing a change in the start up screen displayed on a screen Sc1 in step S225.

FIG. 5 is an illustrative diagram showing a change in the start up screen displayed on the screen Sc1 in step S225. At the time T3, the start up screen not being displayed because step S225 has not yet been executed, a completely white image F0 is projected onto the screen Sc1. On step S225 being started at the time T4, a start up screen F1 is projected onto the screen Sc1. At a point at which step S225 is started, as the light quantity in each of the laser light source devices 100*r*, 100*g* and 100*b* is Pmax, the start up screen F1 is displayed in the brightest condition. In the example of FIG. 5, a logo showing a name of the manufacturer of the projector 1000 is displayed as the start up screen F1. At a time T5, the light quantity in each of the laser light source devices 100*r*, 100*g* and 100*b* decreasing from Pmax, the start up screen F1 is dimly exposed. Then, at the time T6, the light quantity becomes zero, and the start up screen F1 ceases to be exposed. Seen by a user, after the logo is exposed on the screen Sc1 at the maximum brightness, it appears to gradually fade out.

In step S230 (FIG. 3), the voltage/light quantity characteristic derivation unit 21*c*, based on the light quantity data obtained in step S225, derives the voltage/light quantity characteristic, compiles a voltage/light quantity characteristic table, and rewrites the voltage/light quantity characteristic table 23*b* stored in the EEPROM 23. The process of step S230 corresponds to a third process in the claims.

Figure 6:
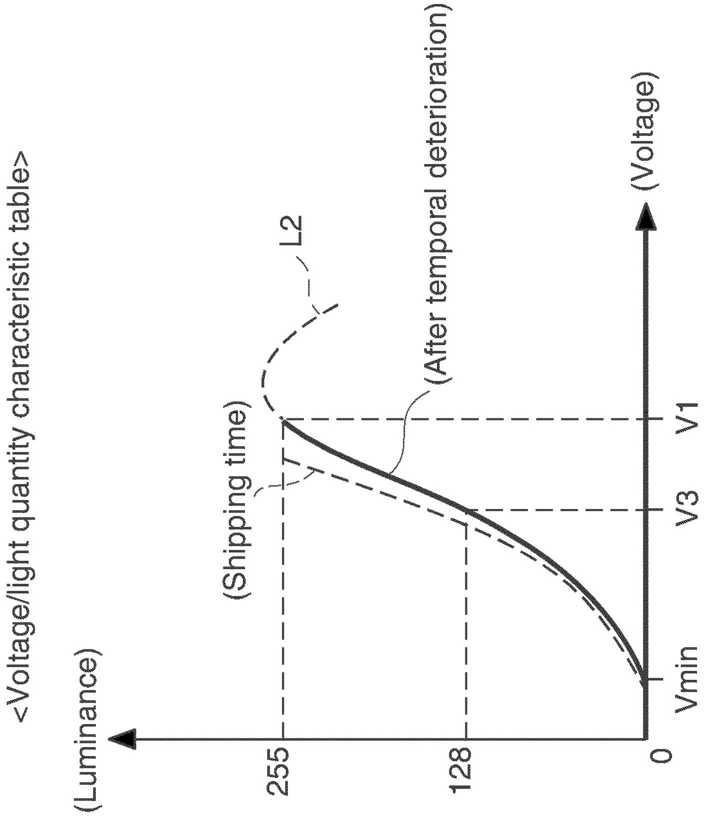
FIG. 6 is an illustrative diagram schematically showing a voltage/light quantity characteristic table 23*b* rewritten in step S230.

FIG. 6 is an illustrative diagram schematically showing the voltage/light quantity characteristic table 23*b* rewritten in step S230. In FIG. 6, a horizontal axis shows the applied voltage, while a vertical axis shows the luminance value. The voltage/light quantity characteristic table 23*b* at the time of shipping before the rewriting is shown by a broken line. The applied voltage necessary for realizing each luminance of 256 levels, from 0 to 255, is indicated in the voltage/light quantity characteristic table 23*b*. For example, the voltage V1 is fixed as the applied voltage for making the luminance value=255 (a maximum luminance value). The voltage V1 is the voltage obtained in step S210 as the applied voltage for obtaining the light quantity Pmax. Also, for example, the voltage V3 is fixed as the applied voltage for making the luminance value=128. Then, as a result of the heretofore described step S230, the voltage/light quantity characteristic table 23*b* differs from the voltage/light quantity characteristic table 23*b* at the time of shipping (the broken line). Specifically, a higher applied voltage is correlated to the same luminance value. Consequently, as the light quantity adjustment unit 21*b* (FIG. 1) controls the voltage control unit 22*a*, and adjusts the applied voltage, based on the voltage/light quantity characteristic table 23*b* after the rewriting, it is possible to display an image at a desired brightness after the temporal deterioration too.

In the example of FIG. 4, a projection and display of a source screen, which differs from the start up screen, is started at a time T8. Herein, the "source screen", being a screen which represents an image provided from an image source, refers to a screen which displays content of an image input from an external instrument connected to the projector 1000, an image stored in a storage device (the RAM 23 or the like) inside the projector 1000, a still image, or the like. Specifically, it refers to, for example, a desktop screen of a personal computer connected to the projector 1000, a menu screen of a DVD player connected to the projector 1000, or the like. Then, as of the time T8, as the voltage/light quantity characteristic table 23*b* has been rewritten as the result of the heretofore described voltage/light quantity characteristic review process, the applied voltage when projecting and displaying the same source screen is higher after the temporal deterioration compared with at the time of shipping. However, as the light quantity is the same as at the time of shipping after the temporal deterioration too, when seen by the user, the source screen is displayed at the same brightness after the temporal deterioration too.

As heretofore described, with the projector 1000, the voltage/light quantity characteristic review process is executed after the start up, and the voltage/light quantity characteristic is reviewed and rewritten. Consequently, it being possible to provide each of the laser light source devices 100*r*, 100*g* and 100*b* with an applied voltage appropriate for obtaining a desired light quantity, it is possible to display an image at the desired light quantity after the temporal deterioration too. Also, in the voltage/light quantity characteristic review process, as the light quantity gradually decreases from the light quantity Pmax to the light quantity zero, it is possible to acquire a large number of items of light quantity data. Consequently, it is possible to review the voltage/light quantity characteristic to a high degree of accuracy. Also, when gradually decreasing the light quantity in the voltage/light quantity characteristic review process, as the start up screen, such as a logo, is displayed, the start up screen appears to fade out when seen by the user. Consequently, when executing such a voltage/light quantity characteristic review process, it is possible to avoid giving the user a feeling that something is wrong.

B. Second Embodiment

Figure 7:
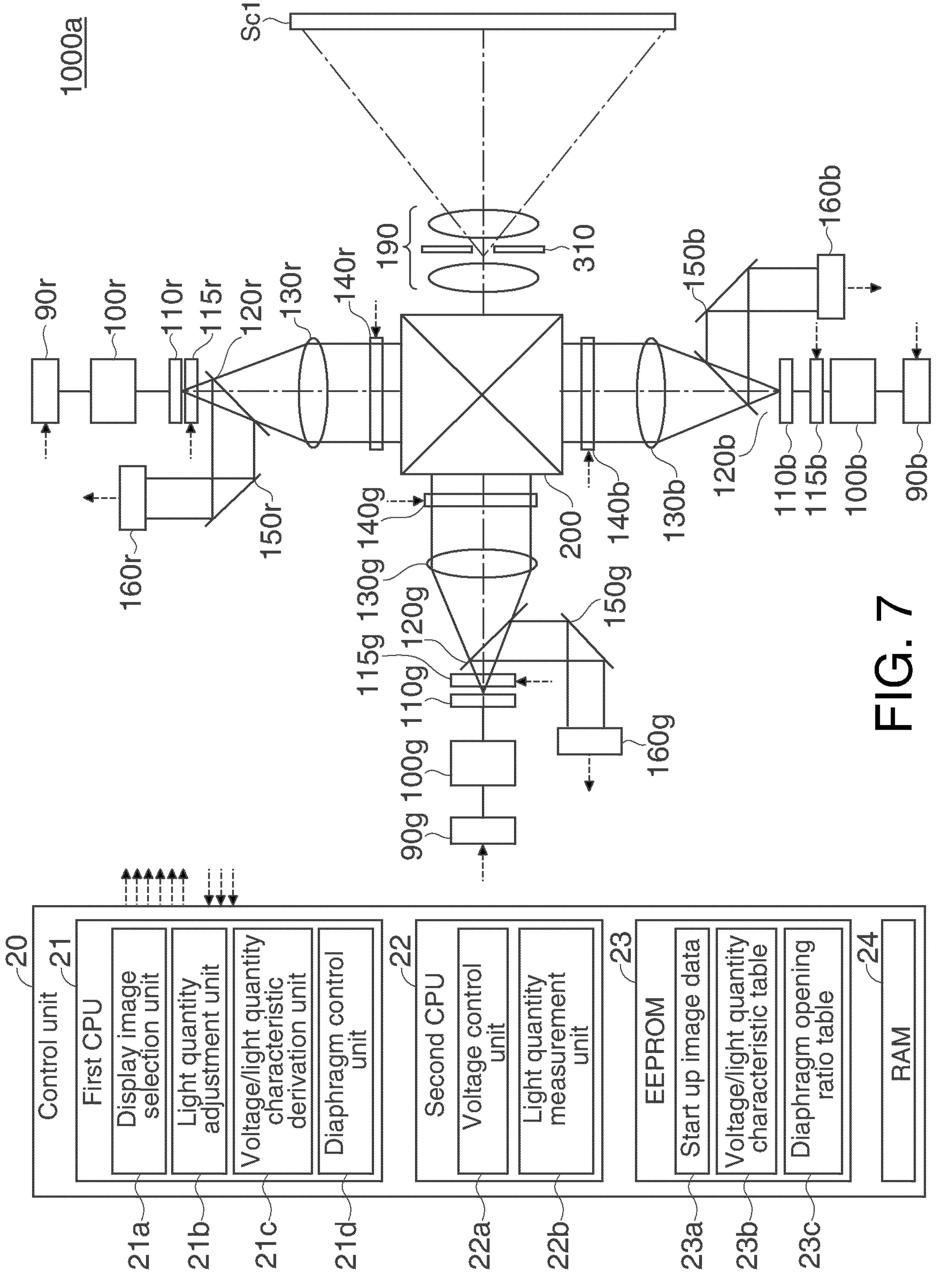
FIG. 7 is an illustrative diagram showing an outline configuration of a projector in a second embodiment.

FIG. 7 is an illustrative diagram showing an outline configuration of a projector in a second embodiment. This projector 1000*a*, including a diaphragm in a stage subsequent to each of the diffusion plates 110*r*, 110*g* and 110*b*, differs from the projector 1000 (FIG. 1) from a point of adjusting the light quantity using such diaphragms, while other configurations are the same as in the first embodiment.

Specifically, in the projector 1000*a*, a diaphragm 115*r* is disposed between the diffusion plate 110*r* and the mirror 120*r*. The diaphragm 115*r*, by its opening ratio being adjusted, can change the light quantity of diffused red light emitted from the diffusion plate 110*r*. In the same way, a diaphragm 115*g* is disposed between the diffusion plate 110*g* and the mirror 120*g*, and a diaphragm 115*b* between the diffusion plate 110*b* and the mirror 120*b*. The first CPU 21, as well as each of the heretofore described function units 21*a* to 21*c*, also functions as a diaphragm control unit 21*d*. The control unit 21*d*, controlling an unshown diaphragm control mechanism, adjusts the opening ratio of each of the diaphragms 115*r*, 115*g* and 115*b*. In addition to the heretofore described start up image data 23*a* and voltage/light quantity characteristic table 23*b*, furthermore, a diaphragm opening ratio table 23*c* is stored in advance, before shipping, in the EEPROM 23.

In the heretofore described first embodiment, the light quantity adjustment unit 21*b*, in order to adjust the light quantity, adjusts the voltage applied to each of the laser light source devices 100*r*, 100*g* and 100*b* by controlling the voltage control unit 22*a*. In the present embodiment, the light quantity adjustment unit 21*b* adjusts the light quantity by, in addition to the adjustment of the light quantity by means of the adjustment of the applied voltage, adjusting the opening ratio of each of the diaphragms 115*r*, 115*g* and 115*b* by controlling the diaphragm control unit 21*d*. Specifically, the diaphragm control unit 21*d*, based on the voltage/light quantity characteristic (light quantity data) obtained by the heretofore described voltage/light quantity characteristic review process, refers to the diaphragm opening ratio table 23*c*, and adjusts the opening ratio of each of the diaphragms 115*r*, 115*g* and 115*b*.

In the embodiment, the rewriting of the voltage/light quantity characteristic table 23*b* (step S230) is not executed in the voltage/light quantity characteristic review process. Consequently, the voltage control unit 22*a*, based on the voltage/light quantity characteristic table 23*b* stored in advance at the time of shipping, adjusts the light quantity by adjusting the voltage applied to each of the laser light source devices 100*r*, 100*g* and 100*b* in accordance with the luminance value in the image data, after the temporal deterioration too.

Figure 8A:
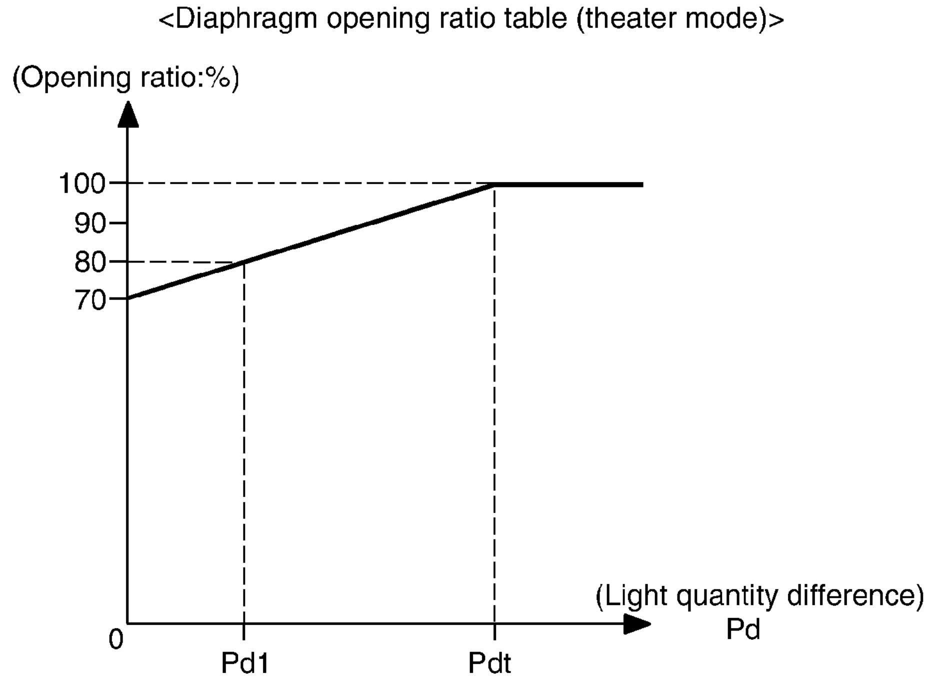
FIG. 8A is an illustrative diagram schematically showing a diaphragm opening ratio table 23*c* shown in FIG. 7.
Figure 8B:
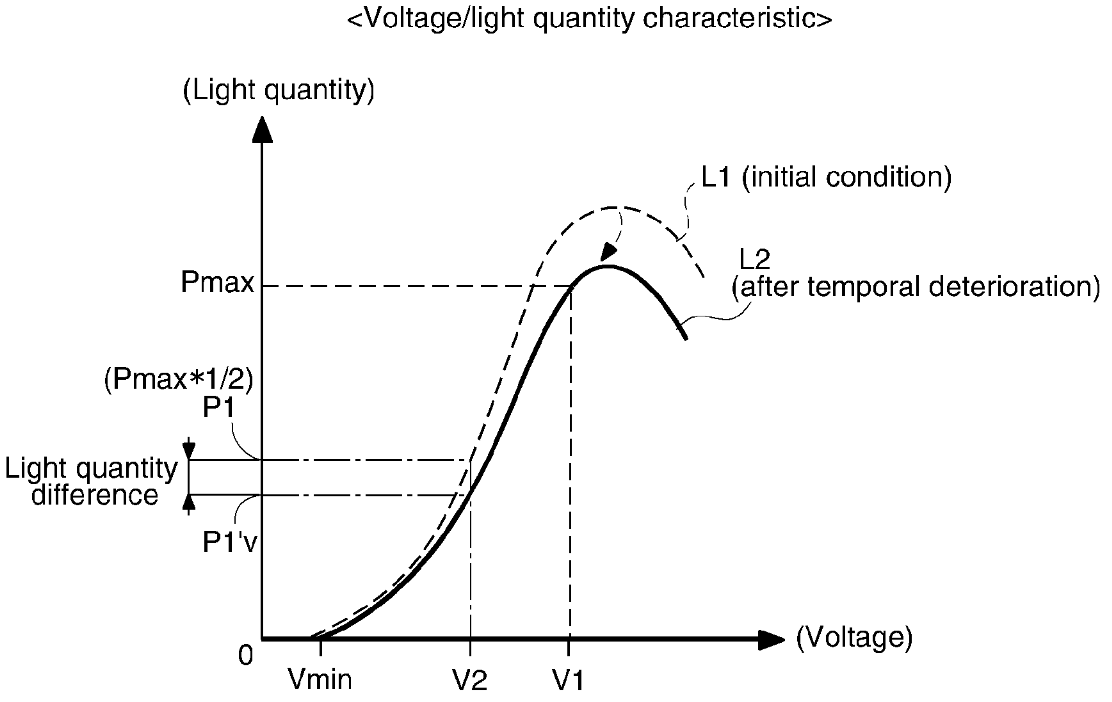
FIG. 8B is an illustrative diagram showing the voltage/light quantity characteristic obtained by the voltage/light quantity characteristic review process.

FIG. 8A is an illustrative diagram schematically showing the diaphragm opening ratio table 23*c* shown in FIG. 7. Also, FIG. 8B is an illustrative diagram showing the voltage/light quantity characteristic obtained by the voltage/light quantity characteristic review process. Also, the two lines L1 and L2 in FIG. 8B are the same as the two lines L1 and L2 in FIG. 2.

After the voltage/light quantity characteristic review process is executed, the diaphragm control unit 21*d* acquires alight quantity P1' at the voltage V2 (FIG. 8B) from the light quantity data (voltage/light quantity characteristic) obtained in the heretofore described step S225. Herein, the voltage V2 is the applied voltage necessary for obtaining the light quantity P1, which is one half of the maximum emitted light quantity Pmax, at the time of shipping. Then, the voltage/light quantity characteristic differing between the time of shipping and after the temporal deterioration, as heretofore described, the light quantity P1' at the voltage V2 after the temporal deterioration is smaller than the light quantity P1. Then, the diaphragm control unit 21*d* calculates a difference in light quantity between the light quantity P1 and the light quantity P1'.

In the diaphragm opening ratio table 23*c* (FIG. 8A), the diaphragm opening ratio (70 to 100%) is fixed in accordance with the previously mentioned light quantity difference at the voltage V2. A diaphragm opening ratio table is stored in the EEPROM 23 for each display mode, such as a comparatively dark theater mode and a comparatively bright dynamic mode. In FIG. 8A, the diaphragm opening ratio table in the theater mode is shown.

For example, in the event that the light quantity difference is zero at the voltage V2 at a point immediately after shipping, the diaphragm opening ratio is determined, based on the diaphragm opening ratio table 23*c* (FIG. 8A), to be 70% (an initial value). On so doing, the diaphragm control unit 21*d* controls in such a way that the opening ratio of each of the diaphragms 115*r*, 115*g* and 115*b* is 70%. In the example of FIG. 8B, the light quantity difference being Pd1, the diaphragm opening ratio is determined, based on the diaphragm opening ratio table 23*c* (FIG. 8A), to be 80% in the case of such a light quantity difference Pd1. Then, the diaphragm control unit 21*d* controls in such a way that the opening ratio of each of the diaphragms 115*r*, 115*g* and 115*b* is 80%.

By so doing, even in the event that the voltage/light quantity characteristic of each of the laser light source devices 100*r*, 100*g* and 100*b* changes due to the temporal deterioration, as the opening ratio of each of the diaphragms 115*r*, 115*g* and 115*b* increases, it is possible to prevent a display image (a picture) as a whole from being dimly exposed. Consequently, it is possible to display the image at a desired light quantity.

C. Modification Examples

Of configuration elements in each of the heretofore described embodiments, elements other than elements claimed in the independent claim, being additional elements, can be appropriately omitted. Also, the invention not being limited to the heretofore described working examples and embodiments, it can be implemented in various aspects without departing from the scope of the invention; for example, the following modifications are also possible.

C1. Modification Example 1

In the heretofore described first embodiment, the voltage applied to each of the laser light source devices 100*r*, 100*g* and 100*b* is adjusted in order to adjust the light quantity emitted from the projector 1000. Also, in the second embodiment, the opening ratio of each of the diaphragms 115*r*, 115*g* and 115*b* is adjusted for the light quantity adjustment. However, the invention is not limited to these. For example, it is also possible to adjust the light quantity emitted from the projector 1000 by adjusting both the voltage applied to each of the laser light source devices 100*r*, 100*g* and 100*b*, and the opening ratio of each of the diaphragms 115*r*, 115*g* and 115*b*. Also, in each of the heretofore described embodiments, the light quantity adjustment unit 21*b* adjusts the light quantity of the source light emitted from each of the laser light source devices 100*r*, 100*g* and 100*b*, but it is also possible to adjust the image light from the image light emission unit. For example, it is also possible to adjust the light quantity of the image light emitted from the projector 1000 by adjusting an opening ratio of a diaphragm (not shown) included in the projection optical system 190. Furthermore, it is also possible to adjust the light quantity of the image light emitted from the projector 1000 by adjusting a degree to which the incident light is modulated in each of the liquid crystal light valves 140*r*, 140*g* and 140*b*. In this way, it is possible to adopt a configuration wherein the light quantity adjustment unit adjusts the light quantity of at least one of the source light and the image light.

C2. Modification Example 2

In the heretofore described first embodiment, the voltage applied to each of the laser light source devices 100*r*, 100*g* and 100*b* is adjusted in order to adjust the light quantity emitted from the projector 1000 but, instead of this, it is also possible to adjust the light quantity by adjusting the current supplied to each of the laser light source devices 100*r*, 100*g* and 100*b*. In this case, a current/light quantity characteristic table is compiled instead of the voltage/light quantity characteristic table 23*b*, and it is possible to display an image at a desired brightness by adjusting the current supplied to each of the laser light source devices 100*r*, 100*g* and 100*b*, based on the characteristic table. That is, generally, it is possible to employ an optional configuration, wherein it is possible to adjust the light quantity by adjusting the power (voltage× current) supplied to each of the laser light source devices 100*r*, 100*g* and 100*b*, in an image display apparatus of the invention.

C3. Modification Example 3

In each of the heretofore described embodiments, the review of the voltage/light quantity characteristic is carried out immediately after the start up (turning on the power) of the projectors 1000 and 1000*a*, but it is also possible to adopt a configuration wherein it is carried out at another optional timing. For example, it is also possible to execute it when turning off the power of the projectors 1000 and 1000*a*. With this configuration, the start up screen F1 gradually fading out, and the power supply being cut off after that, it does not happen that the user is given the feeling that something is wrong. Also, it is also possible to configure in such a way that, after the start up, it is determined whether or not an external instrument (not shown), such as a personal computer or a DVD player, is connected to the projector 1000 or 1000*a* and, in the event that one is connected, the voltage/light quantity characteristic review process is executed. With this configuration, in the event that no external instrument is connected, it is also possible, displaying the completely white screen F0 (FIG. 5), or a predetermined initial screen which differs from the start up screen F1, not to execute the voltage/light quantity characteristic review process.

With this kind of configuration, the voltage/light quantity characteristic review process is executed immediately before an image (for example, a personal computer desktop image) input from the external instrument is projected, and the start up screen F1 fades out. Consequently, the display image changes from the start up screen F1 to the image from the external instrument, with no feeling that something is wrong as seen by the user. In addition to each of the heretofore described timings, it is also possible to arrange in such a way as to acquire the light quantity data in a flyback period when projecting and displaying content, and rewrite the voltage/light quantity characteristic table 23*b*.

C4. Modification Example 4

In each of the heretofore described embodiments, the light quantity is gradually decreased in the voltage/light quantity characteristic review process but, instead of this, it is also acceptable to arrange in such a way as to gradually increase the light quantity. For example, it is also acceptable to arrange in such a way as to reduce the light quantity from Pmax to zero in a short time at the time T4 (FIG. 4), and subsequently acquire the light quantity data while gradually increasing the light quantity. In this case, the start up screen F1 is exposed in such a way as to gradually fade in, as seen by the user. As can also be understood from the heretofore described embodiments and modification examples, it is possible to employ, in the image display apparatus of the invention, the kind of optional change method whereby the light quantity of the light emitted from each of the laser light source devices 100*r*, 100*g* and 100*b* gradually changes.

C5. Modification Example 5

In each of the heretofore described embodiments, the image used in the voltage/light quantity characteristic review process is the start up screen F1 but, instead of this, it is also possible to use another optional image. For example, it is also possible to use an image (for example, a personal computer desktop image) input from an external instrument (not shown) connected to the projectors 1000 and 1000*a*. Also, for example, in the event that the external instrument is a DVD player, it is also possible to use an image of an initial menu screen, or of a first frame of a moving image recorded on a DVD.

C6. Modification Example 6

In the heretofore described first embodiment, the light quantity adjustment unit 21*b* uses the voltage/light quantity characteristic table 23*b* in order to control the voltage control unit 22*a*, and adjust the applied voltage, but it is also possible to use, instead of the voltage/light quantity characteristic table 23*b*, an approximate expression showing the voltage/light quantity characteristic. Specifically, for example, parameters (for example, in the event that the approximate expression is a linear function, an orientation and an intercept) expressing the approximate expression (a linear function, a quadratic function, or the like) of the voltage/light quantity characteristic are stored in advance in the EEPROM 23. Then, the light quantity adjustment unit 21*b*, as well as calculating the applied voltage for obtaining a desired light quantity from such an approximate expression, controls the voltage control unit 22*a* in such a way as to attain the calculated applied voltage. Then, it is also possible to adopt a configuration such that, in the voltage/light quantity characteristic review process step S230, the voltage/light quantity characteristic derivation unit 21*c*, based on the light quantity data obtained in step S225, derives the approximate expression again, and overwrites the parameters expressing such an approximate expression in the EEPROM 23.

C7. Modification Example 7

In each of the heretofore described embodiments, in the voltage/light quantity characteristic review process step S225 (FIG. 3), each item of light quantity data is recorded over a whole of the period during which the light quantity changes from Pmax to zero but, instead of this, it is also possible to record the light quantity data in only one portion of the whole period during which the light quantity changes. For example, it is also possible to record the light quantity data after the light quantity has decreased to one half (P1) of Pmax. Even in this case, it is possible to estimate and obtain the light quantity data for the light quantity between P1 and Pmax based on the light quantity data for the light quantity between zero and P1. By so doing, it being sufficient that the amount of obtained light quantity data is comparatively small, it is possible to make a storage capacity of the RAM 24 comparatively small.

C8. Modification Example 8

In each of the heretofore described embodiments, the liquid crystal light valves 140*r*, 140*g* and 140*b* are of a transmissive type but, instead of this, it is also possible to use a reflective type of liquid crystal light valve (LCOS). Also, in each of the embodiments, the liquid crystal light valves 140*r*, 140*g* and 140*b* are used as a light modulating element, but it is possible to use another optional light modulating element. For example, it is also possible to use a micromirror type light modulating device, such as a DMD (Digital Micromirror Device) (trademark of TI). Also, in each of the heretofore described embodiments, application examples of the projection type projectors 1000 and 1000*a* are shown but, not being limited to the projection type projector, it is possible to apply the invention to another optional image display apparatus. For example, it is also possible to apply the invention to a laser scanning type (laser drawing type) projector which does not use a light valve (a transmissive type or reflective type liquid crystal light valve, a DMD, or the like), a television receiver, a rear projection type display apparatus, a liquid crystal display apparatus, and the like. Also, it is also possible to employ a lamp light source, such as a UHP lamp, as the light source device, instead of the laser light source device.

C9. Modification Example 9

In each of the heretofore described embodiments, it is taken that the voltage/light quantity characteristic changes due to the temporal deterioration of each of the laser light source devices 100*r*, 100*g* and 100*b* but, instead of this, it is also possible to apply the invention to a case in which the voltage/light quantity characteristic changes due to an environmental change. For example, in a case in which the usage environment of the projector 1000 or 1000*a* changes, and it is used in an extremely high temperature, the voltage/light quantity characteristic of each of the laser light source devices 100*r*, 100*g* and 100*b* is such that, in contrast to the case of the temporal deterioration, the light quantity increases in comparison with that at the time of shipping in the event that the same applied voltage is provided. Even in this case, as the voltage/light quantity characteristic review process is executed at the start up time, it being possible to obtain the voltage/light quantity characteristic in the high temperature environment, it is possible to appropriately rewrite the voltage/light quantity characteristic table. Consequently, even in such a high temperature environment, it is possible to display an image with a desired light quantity.

C10. Modification Example 10

In each of the heretofore described embodiments, the light quantity adjustment unit 21*b* adjusts the light quantity by controlling the voltage control unit 22*a* or the diaphragm control unit 21*d* but, instead of this, it is also possible to configure in such a way that, omitting the light quantity adjustment unit 21*b*, the voltage control unit 22*a* or the diaphragm control unit 21*d*, referring respectively to the voltage/light quantity characteristic table 23*b* or the opening ratio table 23*c*, adjusts the light quantity. In this case, the voltage control unit 22*a* or the diaphragm control unit 21*d* corresponds to alight quantity adjustment unit in the claims.

C11. Modification Example 11

In the heretofore described embodiments, it is acceptable to replace one portion of the configuration realized by the hardware with software and, conversely, it is also acceptable to replace one portion of the configuration realized by the software with hardware.

What is claimed is:

1. An image display apparatus which displays an image comprising:

a light source device which emits a source light;

a light source control unit which controls a power supplied to the light source device;

an image light emission unit which, utilizing the source light emitted from the light source device, emits an image light expressing the image;

a light quantity measurement unit which measures a light quantity of the source light, the light quantity corresponding to a quantity of emitted light and having a whole range as the power supplied to the light source device is turned on and a voltage applied to the source light reaches a maximum level;

a power/light quantity characteristic derivation unit which derives a power/light quantity characteristic indicating a relationship between the supplied power and the light quantity of the source light; and a light quantity adjustment unit which, based on the power/light quantity characteristic, adjusts the light quantity of at least one of the source light and the image light, wherein the light source control unit executes a first process of gradually decreasing the supplied power such that the light quantity of the source light gradually changes within a portion of a whole range of the light quantity, the light quantity measurement unit executes a second process of measuring the light quantity of the source light as the supplied power is gradually decreased in the first process, and acquiring light quantity data within the portion of the whole range of the light quantity, and the power/light quantity characteristic derivation unit executes a third process of deriving the power/light quantity characteristic by estimating the power/light quantity characteristic between a first value which is within the light quantity data acquired within the portion of the whole range and a second value which is within the whole range but which is not within the light quantity data acquired within the portion of the whole range, the estimation of the power/light quantity characteristic being based on the light quantity data acquired within the portion of the whole range of the light quantity in the second process and on the supplied power.

2. The image display apparatus according to claim 1, wherein the light source control unit, in the first process, changes the supplied power in such a way that the light quantity of the light from the light source device decreases, and the image light emission unit, while the first process is being executed, emits an image light expressing the start up screen.

3. The image display apparatus according to claim 1, wherein in a period from the image display apparatus starting up until displaying a source screen which differs from a start up screen, (i) the light source control unit executes the first process, (ii) the light quantity measurement unit executes the second process, and (iii) the power/light quantity characteristic derivation unit executes the third process.

4. The image display apparatus according to claim 1, wherein the light quantity adjustment unit, based on the power/light quantity characteristic, adjusts the light quantity of the source light by controlling the supplied power, using the light source control unit.

5. A method of controlling a display of an image in image display apparatus, the method comprising:

emitting a source light from a light source device;

controlling a power supplied to the light source device using a light source control unit;

utilizing the source light emitted from the light source device, using an image light emission unit to emit an image light expressing the image;

measuring a light quantity of the source light using a light quantity measurement unit, the light quantity corresponding to a quantity of emitted light and having a whole range as the power supplied to the light source device is turned on and a voltage applied to the source light reaches a maximum level;

deriving a power/light quantity characteristic indicating a relationship between the supplied power and the light quantity of the source light; and based on the power/light quantity characteristic, adjusts the light quantity of at least one of the source light and the image light in a first process by gradually decreasing the supplied power such that the light quantity of the source light gradually changes within a portion of a whole range of the light quantity, wherein the light quantity measurement unit executes a second process of measuring the light quantity of the source light as the supplied power is gradually decreased in the first process, and acquiring light quantity data within the portion of the whole range of the light quantity, and the power/light quantity characteristic derivation unit executes a third process of deriving the power/light quantity characteristic by estimating the power/light quantity characteristic between a first value which is within the light quantity data acquired within the portion of the whole range and a second value which is within the whole range but which is not within the light quantity data acquired within the portion of the whole range, the estimation of the power/light quantity characteristic being based on the light quantity data acquired within the portion of the whole range of the light quantity in the second process and on the supplied power.

6. The method according to claim 5, wherein the light source control unit, in the first process, changes the supplied power in such a way that the light quantity of the light from the light source device decreases, and the image light emission unit, while the first process is being executed, emits an image light expressing the start up screen.

7. The method according to claim 5, wherein in a period from the image display apparatus starting up until displaying a source screen which differs from a start up screen, (i) the light source control unit executes the first process, (ii) the light quantity measurement unit executes the second process, and (iii) the power/light quantity characteristic derivation unit executes the third process.

8. The method according to claim 5, wherein the light quantity of the source light is adjusted based on the power/light quantity characteristic by controlling the supplied power.

* * * * *